US012294844B2

(12) United States Patent
Matsunaga

(10) Patent No.: US 12,294,844 B2
(45) Date of Patent: May 6, 2025

(54) SOUND COLLECTION SYSTEM, SOUND COLLECTION METHOD, AND NON-TRANSITORY STORAGE MEDIUM

(71) Applicant: AUDIO-TECHNICA CORPORATION, Tokyo (JP)

(72) Inventor: Keishi Matsunaga, Tokyo (JP)

(73) Assignee: Audio-Technica Corporation, Tokyo (JP)

(*) Notice: Subject to any disclaimer, the term of this patent is extended or adjusted under 35 U.S.C. 154(b) by 231 days.

(21) Appl. No.: 18/187,914

(22) Filed: Mar. 22, 2023

(65) Prior Publication Data

US 2023/0247361 A1 Aug. 3, 2023

Related U.S. Application Data

(63) Continuation of application No. PCT/JP2021/037733, filed on Oct. 12, 2021.

(30) Foreign Application Priority Data

Nov. 11, 2020 (JP) ................................ 2020-187841

(51) Int. Cl.
*H04R 5/04* (2006.01)
*H04R 3/00* (2006.01)

(52) U.S. Cl.
CPC ............... *H04R 5/04* (2013.01); *H04R 3/005* (2013.01); *H04R 2430/20* (2013.01)

(58) Field of Classification Search
None
See application file for complete search history.

(56) References Cited

U.S. PATENT DOCUMENTS 6,339,758 B1 * 1/2002 Kanazawa .............. G10L 21/02 704/226
6,449,593 B1 * 9/2002 Valve ..................... H04R 3/005 704/233
8,233,642 B2 * 7/2012 Mao ..................... H04R 29/005 381/56

(Continued)

FOREIGN PATENT DOCUMENTS

JP 2009288215 A 12/2009
JP 2013201525 A 10/2013

(Continued)

*Primary Examiner* — Paul W Huber
(74) *Attorney, Agent, or Firm* — WCF IP

(57) ABSTRACT

The sound collection system includes: a first beamformer that outputs a first signal obtained by emphasizing sound coming from a direction within a first range, among sound arriving at a plurality of microphones, more than sound coming from other directions; a second beamformer that outputs a second signal obtained by emphasizing sound coming from a direction within a second range more than sound coming from other directions; a sound source direction detecting part that detects a sound source direction generating sound arriving at the plurality of microphones; and a directivity control part that causes the second beamformer to output the second signal if it is determined that a change angle per unit time of the direction of the sound source detected by the sound source direction detecting part is equal to or greater than a threshold while the first beamformer is outputting the first signal.

13 Claims, 5 Drawing Sheets

(56) References Cited

U.S. PATENT DOCUMENTS

| | | | | |
|---|---|---|---|---|
| 8,731,212 | B2 * | 5/2014 | Takahashi .............. | H04R 3/005 381/94.1 |
| 8,867,755 | B2 * | 10/2014 | Nakadai ................ | G10L 21/028 381/92 |
| 10,015,592 | B2 * | 7/2018 | Yoshida .................. | G01S 3/808 |
| 11,438,691 | B2 * | 9/2022 | Veselinovic ........... | H04R 1/326 |
| 2009/0296526 | A1 | 12/2009 | Amada | |
| 2016/0372129 | A1 * | 12/2016 | Nakadai ................ | G10L 21/028 |
| 2017/0188140 | A1 * | 6/2017 | Duzinkiewicz ........ | H04R 3/005 |
| 2017/0249936 | A1 | 8/2017 | Hayashida et al. | |
| 2017/0280235 | A1 | 9/2017 | Varerkar et al. | |
| 2019/0222927 | A1 | 7/2019 | Matsuo | |
| 2022/0158703 | A1 | 5/2022 | Jiang et al. | |

FOREIGN PATENT DOCUMENTS

| | | | |
|---|---|---|---|
| JP | 2016167645 | A | 9/2016 |
| JP | 2017153065 | A | 8/2017 |
| JP | 2018155996 | A | 10/2018 |
| JP | 2019176332 | A | 10/2019 |
| WO | 2020181533 | A1 | 9/2020 |

* cited by examiner

SOUND COLLECTION SYSTEM, SOUND COLLECTION METHOD, AND NON-TRANSITORY STORAGE MEDIUM

CROSS-REFERENCE TO RELATED APPLICATIONS

The present application is a continuation application of International Application number PCT/JP2021/37733, filed on Oct. 12, 2021, which claims priority under 35 U.S.C § 119(a) to Japanese Patent Application No. 2020-187841, filed on Nov. 11, 2020, contents of which are incorporated herein by reference in their entirety.

BACKGROUND OF THE INVENTION

The present disclosure relates to a sound collection system, a sound collection method, and a non-transitory storage medium storing a program.

There is known a beamforming processing unit that performs beamforming processing using the phase difference in audio signals observed by a plurality of microphones to collect sound in a state where the target of the sound collection is aimed at a sound source (for example, see Japanese Unexamined Patent Application Publication No. 2013-201525).

In a conventional beamforming processing unit, the sound source has been assumed to be one source. Accordingly, in the conventional beamforming processing unit, if another speaker speaks when a voice is collected in a state where the target of the sound collection is aimed at a direction of a speaker, there is a problem that the voice of this other speaker cannot be collected.

BRIEF SUMMARY OF THE INVENTION

Accordingly, the present disclosure has been made in view of these points, and its object is to make it possible to collect voices of a plurality of speakers.

A sound collection system according to a first aspect of the present disclosure includes: a microphone array including a plurality of microphones; a first beamformer that outputs a first signal obtained by emphasizing a sound signal based on sound coming from a direction within a first range, among a plurality of sound signals based on sound arriving at a plurality of microphones, more than sound signals based on sound coming from other directions; a second beamformer that outputs a second signal obtained by emphasizing a sound signal based on sound coming from a direction within a second range, among the plurality of sound signals, more than sound signals based on sound coming from other directions; a sound source direction detecting part that detects a direction of a sound source generating sound arriving at the plurality of microphones; and a directivity control part that causes the second beamformer to output the second signal if it is determined that a change angle per unit time of the direction of the sound source detected by the sound source direction detecting part is equal to or greater than a threshold while the first beamformer is outputting the first signal.

A sound collection method according to a second aspect of the present disclosure includes the steps of: outputting a first signal obtained by emphasizing a sound signal based on sound coming from a direction within a first range, among a plurality of sound signals based on sound arriving at a plurality of microphones, more than sound signals based on sound coming from other directions; detecting a direction of a sound source generating sound arriving at the plurality of microphones; and outputting a second signal obtained by emphasizing a sound signal based on sound coming from a direction within a second range, among the plurality of sound signals more than sound signals, based on sound coming from other directions, if it is determined that a change angle per unit time of the direction of the sound source is equal to or greater than a threshold while the first signal is being output.

A non-transitory storage medium storing a program according to a third aspect of the present disclosure causes a computer to function as: a first beamformer that outputs a first signal obtained by emphasizing a sound signal based on sound coming from a direction within a first range, among a plurality of sound signals based on sound arriving at a plurality of microphones, more than sound signals based on sound coming from other directions; a second beamformer that outputs a second signal obtained by emphasizing a sound signal based on sound coming from a direction within a second range, among the plurality of sound signals, more than sound signals based on sound coming from other directions; a sound source direction detecting part that detects a direction of a sound source generating sound arriving at the plurality of microphones; and a directivity control part that causes the second beamformer to output the second signal if it is determined that a change angle per unit time of the direction of the sound source detected by the sound source direction detecting part is equal to or greater than a threshold while the first beamformer is outputting the first signal.

DETAILED DESCRIPTION OF THE INVENTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

<Outline of the Sound Collection System S According to the Present Embodiment>

Figure 1:
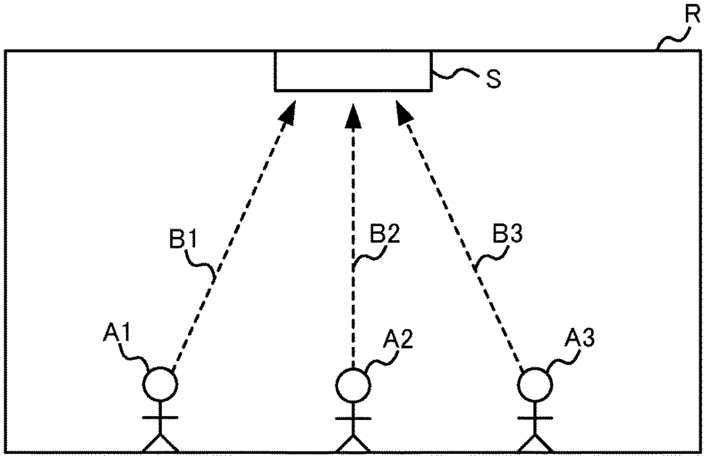
FIG. 1 is a diagram for explaining an outline of a sound collection system S according to the present embodiment.

FIG. 1 is a diagram for explaining an outline of a sound collection system S according to the present embodiment. FIG. 1 is a side view showing the inside of a space R. For example, the space R is a room in a building, but is not limited thereto, and may be a hallway, a lounge, a place for stairs, or the like in a building. As shown in FIG. 1, the sound collection system S is installed on an inner top surface of the space R, and a speaker A1, a speaker A2, and a speaker A3 stay in the space R. Voices B1, B2, and B3 in FIG. 1 are voices generated by the speakers A1, A2, and A3, respectively. In FIG. 1, the sound collection system S is installed on the inner top surface of the space R. It should be noted that the sound collection system S may be installed on an inner side surface or an inner bottom surface of the space R.

The sound collection system S includes a microphone array, which includes a plurality of microphones, and a signal processing apparatus. The signal processing apparatus includes a plurality of beamformers that perform signal processing on sound arriving at the microphone array. The sound collection system S uses a beamformer coefficient corresponding to sound source directions detected by each of the plurality of beamformers to perform beamforming, thereby simulatively forming a plurality of directional microphones. The beamformer coefficient will be described later.

Figure 2:
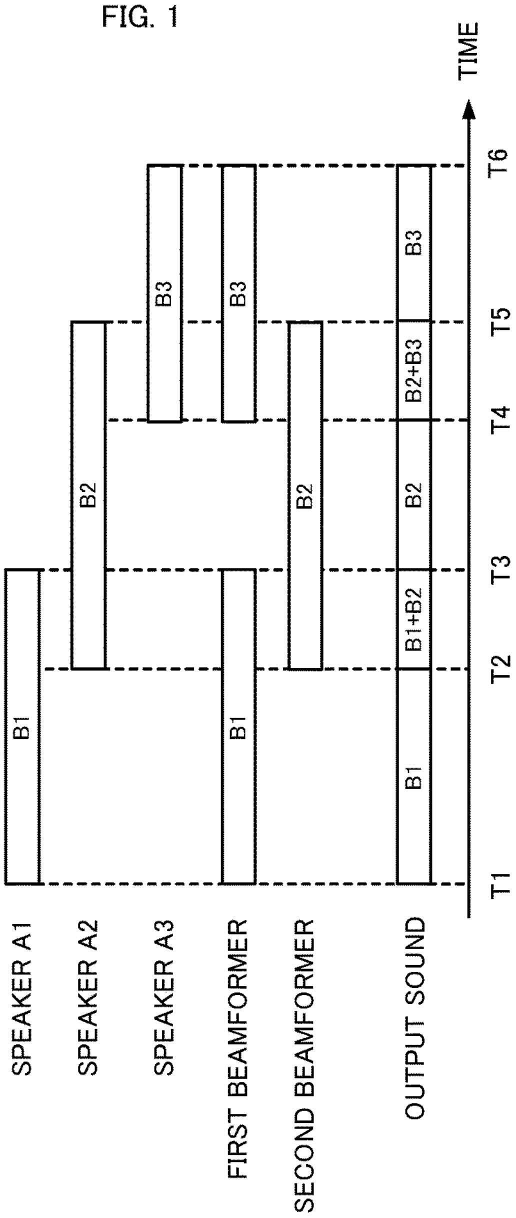
FIG. 2 is a diagram showing, in time series, an operation by which the sound collection system S collects a plurality of voices generated by a plurality of speakers.

FIG. 2 is a diagram showing, in time series, an operation by which the sound collection system S collects a plurality of voices generated by a plurality of speakers. The horizontal axis in FIG. 2 represents a timing. The "speaker A1", "speaker A2", and "speaker A3" shown in the vertical axis of FIG. 2 indicate the duration for which the speakers A1, A2 and A3 generate the voices B1, B2 and B3, respectively. A "first beamformer" and a "second beamformer" shown in the vertical axis of FIG. 2 indicate the duration for which the first beamformer and the second beamformer included in the sound collection system S perform the beamforming processing, and a voice having a sound source direction identified in the beamforming processing. An "output sound" indicates a voice that is collected by the sound collection system S and is output to an external device. The external device is, for example, a computer having a router or a storage medium connected to a communication network.

As shown in FIG. 2, the speaker A1 generates a voice B1 from a timing T1 to a timing T3, the speaker A2 generates a voice B2 from a timing T2 to a timing T5, and the speaker A3 generates a voice B3 from a timing T4 to a timing T6. At the timing T1, the sound collection system S detects the voice B1 to start the beamforming processing with the first beamformer and identifies the sound source direction of the voice B1. At the timing T2, the sound collection system S detects the voice B2 coming from a different direction than the voice B1 to start the beamforming processing with the second beamformer, thereby identifying the sound source direction of the voice B2. At the timing T3, the sound collection system S stops the beamforming processing with the first beamformer.

At the timing T4, the sound collection system S detects the sound source direction of the voice B3, and starts the beamforming processing with the first beamformer. At the timing T5, the sound collection system S stops the beamforming processing with the second beamformer. As a result, the sound collection system S collects the voice B1 from the timing T1 to the timing T2, and collects the voice B1 and the voice B2 from the timing T2 to the timing T3. The sound collection system S collects the voice B2 from the timing T3 to the timing T4, and collects the voice B2 and the voice B3 from the timing T4 to the timing T5. From the timing T5 to the timing T6, the sound collection system S collects the voice B3.

Since the sound collection system S has a plurality of beamformers as described above, the sound collection system S simulates the same situation as a state where a plurality of narrow directional microphones are directed toward each of the sound source directions, and collects sound. Further, even if a speaker who generates a voice is switched in a case where the number of speakers is larger than the number of beamformers, the sound collection system S can collect voices of the plurality of speakers without interruption by switching the plurality of beamformers.

Although the sound collection system S in FIG. 2 stops the beamforming processing together with the stoppage of a voice generated by a speaker, the beamforming processing may be continued even after the stoppage of a voice generated by a speaker. For example, the sound collection system S may stop the beamforming processing started at the timing T1 with the first beamformer, not at the timing T3 but at a timing after a predetermined time period has passed from the timing T3. Further, the sound collection system S may continue the beamforming processing without stopping the beamforming processing with the first beamformer at the timing T3. In this case, when the sound source direction of the voice B3 is detected at the timing T4, the sound collection system S switches the direction of the beamforming with the first beamformer to the sound source direction of the voice B3.

<Configuration of the Sound Collection System S>

Figure 3:
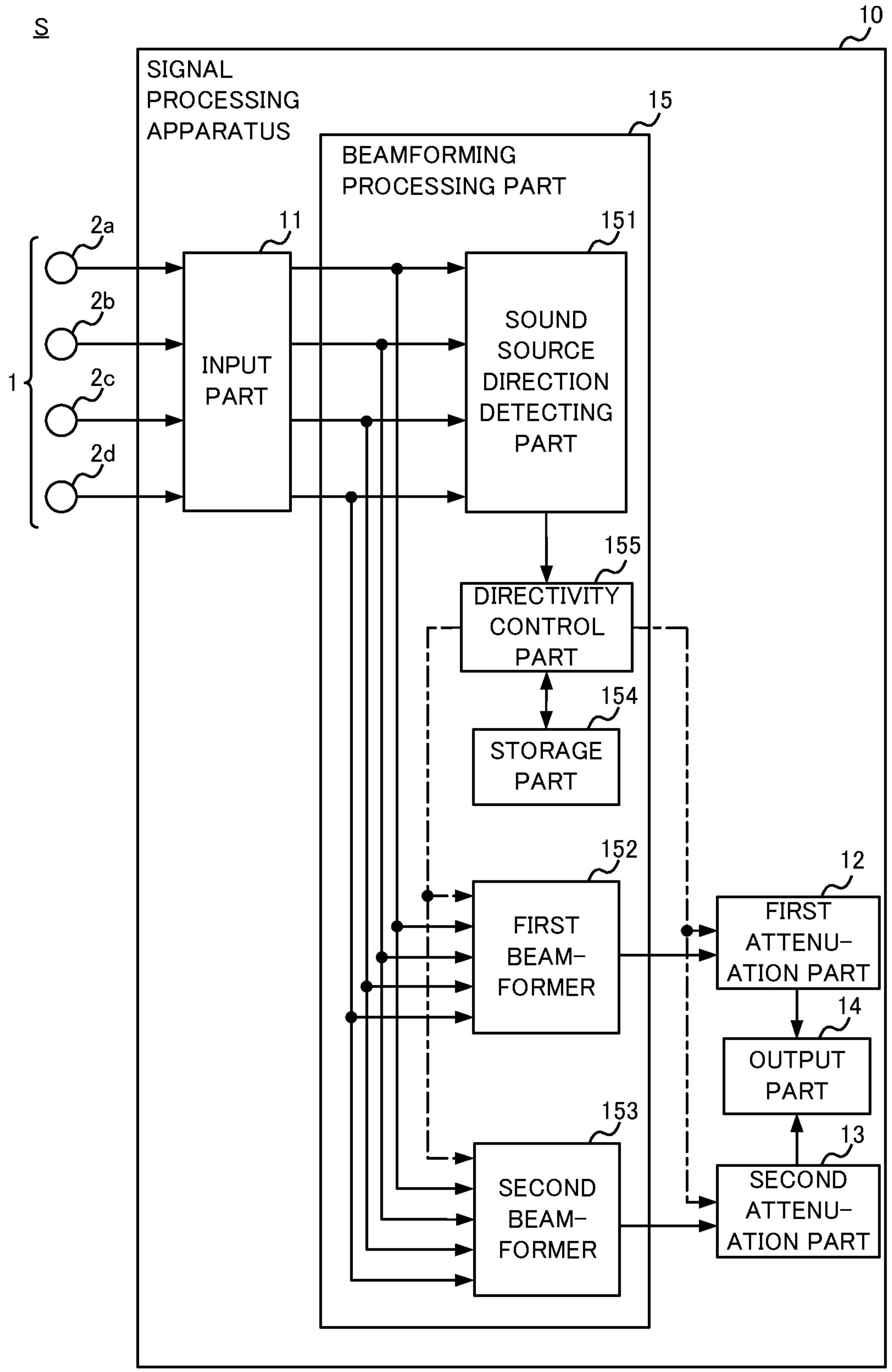
FIG. 3 is a diagram for explaining a configuration of the sound collection system S.

FIG. 3 is a diagram for explaining a configuration of the sound collection system S. The sound collection system S includes a microphone array 1 and a signal processing apparatus 10. The microphone array 1 includes a plurality of microphones 2 (microphones 2*a*, 2*b*, 2*c*, and 2*d*). The plurality of microphones 2 output electrical signals based on sound that has arrived thereat. The signal processing apparatus 10 processes electrical signals output from the plurality of microphones 2 to increase directivity towards a sound source direction, thereby emphasizing and outputting sound generated from the sound source.

The signal processing apparatus 10 includes an input part 11, a first attenuation part 12, a second attenuation part 13, an output part 14, and a beamforming processing part 15. The input part 11 includes a preamplifier and an analog-to-digital (A/D) converter, for example. The input part 11 converts a plurality of analog electrical signals input from each of the plurality of microphones 2 into a plurality of digital signals to generate a plurality of sound signals. The input part 11 generates a plurality of amplified signals obtained by amplifying the analog electrical signals input from the respective plurality of microphones 2, for example. The input part 11 converts the plurality of amplified signals into a plurality of digital signals to generate a plurality of sound signals. The input part 11 outputs the plurality of generated sound signals to the beamforming processing part 15.

The first attenuation part 12 and the second attenuation part 13 decrease or increase the level of a signal input from the beamforming processing part 15. The first attenuation part 12 and the second attenuation part 13 decrease or increase the level of a signal output from the beamforming processing part 15 on the basis of an attenuator gain acquired from the beamforming processing part 15. The attenuator gain corresponds to an attenuation factor, which is a decrease amount or an increase amount of the level of a signal with respect to the level of a signal before having the level of the signal decreased or increased in the first attenuation part 12 and the second attenuation part 13. The first attenuation part 12 and the second attenuation part 13 output, to the output part 14, a signal obtained by decreasing or increasing the level of the signal.

The output part 14 outputs the signal input from the first attenuation part 12 and the second attenuation part 13. The output part 14 generates an output sound signal obtained by adding the signal output by the first attenuation part 12 and the signal output by the second attenuation part 13, and outputs the generated output sound signal. The output part 14 includes, for example, a digital-to-analog (D/A) converter, and converts a digital output sound signal into an analog signal to output the converted analog signal.

The beamforming processing part 15 includes a sound source direction detecting part 151, the first beamformer 152, the second beamformer 153, a storage part 154, and a directivity control part 155. The beamforming processing part 15 is configured by a processor for digital signal processing, for example.

The sound source direction detecting part 151 detects a direction of a sound source generating sound that arrived at the plurality of microphones 2. For example, if the microphone array 1 is installed on the inner top surface of a space, the direction of the sound source is represented by an angle between a) a straight line starting from the central position of the microphone array 1 and extending in the vertical direction, and b) a straight line connecting the position of a microphone 2 and the position of the sound source. The sound source direction detecting part 151 detects the direction of the sound source by using the delay-sum array method on the basis of a difference in timings at which sound arrives at each of the plurality of microphones 2, for example. The sound source direction detecting part 151 notifies the directivity control part 155 of the detected direction of the sound source.

Among a plurality of sound signals based on sound collected by the plurality of microphones 2, the first beamformer 152 outputs a first signal obtained by emphasizing a sound signal based on sound coming from a direction within a first range more than a sound signal based on sound coming from other directions. The first range is a range defined around the direction of the first sound source notified from the sound source direction detecting part 151. The size of the first range is determined by the number of the plurality of microphones 2 and a beamformer coefficient set for the first beamformer 152, for example.

The first beamformer 152 generates the first signal by synthesizing a plurality of sound signals input from the input part 11. By using the beamformer coefficient input from the directivity control part 155, the first beamformer 152 generates a plurality of sound signals such that the level of the sound signal based on the sound coming from the direction within the first range is higher than the levels of the sound signals based on the sound coming from the other directions. The first beamformer 152 generates the first signal by synthesizing a plurality of generated sound signals. The first beamformer 152 outputs the generated first signal to the first attenuation part 12.

Figure 4:
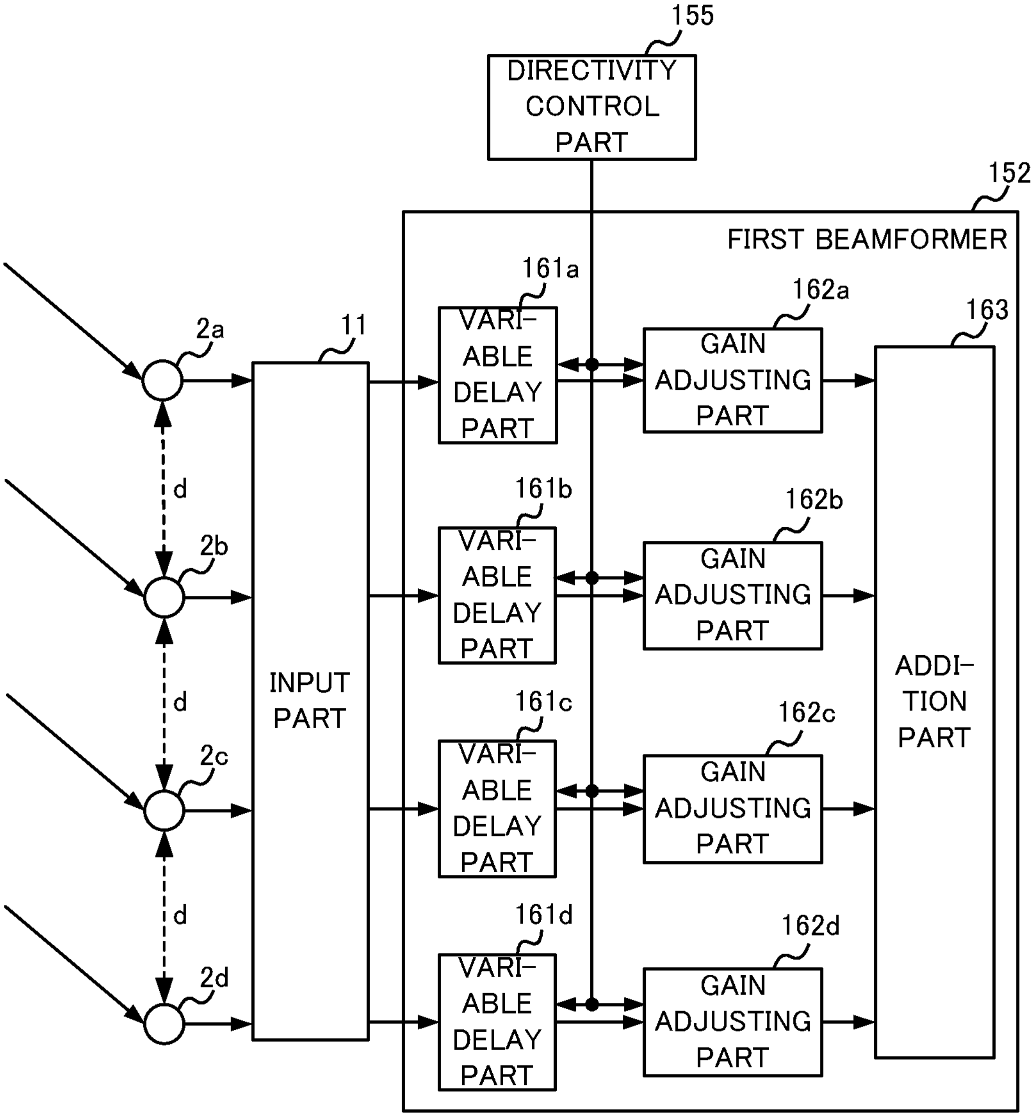
FIG. 4 is a diagram for explaining a configuration of a first beamformer 152.

FIG. 4 is a diagram for explaining a configuration of the first beamformer 152. The first beamformer 152 includes a plurality of variable delay parts 161 (variable delay parts 161*a*, 161*b*, 161*c* and 161*d*), a plurality of gain adjusting parts 162 (gain adjusting parts 162*a*, 162*b*, 162*c* and 162*d*), and an addition part 163.

The variable delay part 161 delays a plurality of sound signals acquired from the input part 11 on the basis of a delay amount input from the directivity control part 155. The beamformer coefficient corresponds to a delay amount, which is a time period corresponding to a difference in distances from a sound source to each of the plurality of microphones 2 (hereinafter referred to as a "propagation distance"), and the variable delay part 161 delays the sound signal on the basis of the delay amount of the beamformer coefficient, for example. By having the variable delay part 161 delay the sound signal by a time period corresponding to the difference in the propagation distances, a difference in timings at which a plurality of sounds that have arrived at the plurality of microphones 2 is corrected, and thus a plurality of sound signals from a direction where the first beamformer 152 has the strongest directivity become the same phase.

The gain adjusting part 162 adjusts the gain of the signal after the variable delay part 161 has caused the delay. The beamformer coefficient corresponds to the gain, and the gain adjusting part 162 amplifies or attenuates the signal delayed by the variable delay part 161, on the basis of the gain corresponding to the beamformer coefficient, for example. Each gain of the plurality of gain adjusting parts 162 is determined according to the beamformer coefficient.

The addition part 163 adds a plurality of signals generated by the plurality of gain adjusting parts 162. The signal output from the gain adjusting part 162 corresponding to the direction within the first range is larger than signals output from other gain adjusting parts 162. Accordingly, the addition part 163 adds a plurality of signals to generate a first signal obtained by emphasizing a sound signal based on sound coming from a direction within the first range more than a sound signal based on sound coming from another direction.

Referring back to FIG. 3, among the plurality of sound signals input from the input part 11, the second beamformer 153 outputs a second signal obtained by emphasizing a sound signal based on sound coming from a direction within a second range more than sound signals based on sound coming from other directions. The second range is a range defined around a direction of the second sound source notified from the sound source direction detecting part 151. The size of the second range is determined by the number of the plurality of microphones 2, and the beamformer coefficient set for the second beamformer 153, for example.

The second beamformer 153 generates the second signal by synthesizing the plurality of sound signals input from the input part 11. The second beamformer 153 uses the beamformer coefficient input from the directivity control part 155 to generate a plurality of sound signals such that the level of the sound signal based on the sound coming from the direction within the second range is larger than the levels of the sound signals based on the sound coming from the other directions. The second beamformer 153 generates the second signal by synthesizing a plurality of generated sound signals. The second beamformer 153 outputs the generated second signal to the second attenuation part 13. A configuration of the second beamformer 153 is the same as the configuration of the first beamformer 152 shown in FIG. 4.

The storage part 154 includes a storage medium such as a random access memory (RAM) and a solid state drive (SSD). The storage part 154 stores an attenuation coefficient for calculating an attenuator gain used by the first attenuation part 12 and the second attenuation part 13. The storage part 154 stores a beamformer coefficient in association with a direction of a sound source.

The storage part 154 may store a direction of a sound source detected by the sound source direction detecting part 151 and a beamformer coefficient in association with each other. For example, the storage part 154 stores a) directions of sound sources detected by the sound source direction detecting part 151 in the past, and b) beamformer coefficients calculated by the directivity control part 155 in the past on the basis of these directions, in association with each other.

Further, the storage part 154 stores a program for causing a processor to function as the sound source direction detecting part 151, the first beamformer 152, the second beamformer 153, and the directivity control part 155.

The directivity control part 155 determines the beamformer coefficients for the first beamformer 152 and the second beamformer 153 on the basis of the direction of the sound source notified from the sound source direction detecting part 151, and controls the first beamformer 152 and the second beamformer 153. For example, the directivity control part 155 causes the first beamformer 152 or the second beamformer 153 to output the first signal or the second signal using a beamformer coefficient, which is stored in the storage part 154 in association with the direction of the sound source detected by the sound source direction detecting part 151. Further, the directivity control part 155 controls the attenuation factors of the first attenuation part 12 and the second attenuation part 13.

If it is determined that the sound source generating sound has changed on the basis of the direction of the sound source notified from the sound source direction detecting part 151, the directivity control part 155 changes the beamformer coefficients set for the first beamformer 152 and the second beamformer 153, and the attenuation factors of the first attenuation part 12 and the second attenuation part 13. In order to detect that the sound source has changed or moved, the directivity control part 155 stores, in the storage part 154, angle information indicating the direction of the sound source notified from the sound source direction detecting part 151. The directivity control part 155 calculates a change angle, which is a difference between an angle detected by the sound source direction detecting part 151 at the current timing and an angle indicated by the angle information before a unit time stored in the storage part 154 (hereinafter referred to as an "immediately preceding angle").

If the change angle per unit time, which is a difference between the current timing and the immediately preceding timing, is equal to or greater than a threshold, the directivity control part 155 determines that the sound source generating the sound has changed. On the other hand, if the change angle is less than the threshold, the directivity control part 155 determines that the sound source generating the sound has moved. The unit time is 0.1 second, for example. The threshold is a value set on the basis of the minimum direction difference between a plurality of sound sources, and is 10 degrees, for example.

If it is determined that a new sound source has been detected, the directivity control part 155 performs signal processing in a range including the new sound source, using a beamformer that is not being used among the plurality of beamformers. Specifically, if it is determined that the change angle per unit time of the direction of the sound source detected by the sound source direction detecting part 151 is equal to or greater than the threshold while the first beamformer 152 is outputting the first signal, the directivity control part 155 causes the second beamformer 153 to output the second signal. That is, if it is determined that the direction of the sound source detected by the sound source direction detecting part 151 is the direction of a new sound source that is not included in the first range, the directivity control part 155 causes the second beamformer 153 to output the second signal.

The directivity control part 155 determines the second range such that the second range includes the direction of the newly detected sound source before causing the second beamformer 153 to output the second signal. The directivity control part 155 calculates a beamformer coefficient corresponding to the determined second range, and sets the calculated beamformer coefficient for the plurality of gain adjusting parts 162, thereby causing the second beamformer 153 to output the second signal. By having the directivity control part 155 operate in this way, when a new sound source starts generating sound, the signal processing apparatus 10 can collect the sound in a state of having the directivity towards the direction of the new sound source.

On the other hand, if it is determined that the change angle per unit time of the direction of the sound source is less than the threshold while the first beamformer 152 is outputting the first signal, the directivity control part 155 causes the first beamformer 152 to continuously output the first signal in a state where the first range has been changed. In other words, the directivity control part 155 determines that the same sound source as at the immediately preceding timing has been detected at the current timing, and continues to use the beamformer that is collecting sound in a state of having the directivity towards the range including the detected sound source.

As described above, if it is determined that the change angle per unit time of the direction of the sound source is less than the threshold even though it is determined that the detected sound source was at a position different from that at the immediately preceding timing, the directivity control part 155 does not switch the beamformer being operated. That is, if the change angle per unit time of the direction of the sound source is less than the threshold even though the position of the sound source has changed, the directivity control part 155 determines that the same sound source as at the immediately preceding timing has been detected. Then, the directivity control part 155 changes a direction of directivity by changing a beamformer coefficient to be set for a beamformer in operation, on the basis of the change angle. The directivity control part 155 operating in this way allows the signal processing apparatus 10 to collect sound without switching the beamformer when a speaker generates a voice while moving, for example, and thus it is possible to prevent variation in the level of collected sound.

If another new sound source (a sound source in a third direction) has been detected while the second beamformer 153 is outputting the second signal, the directivity control part 155 collects sound generated by the detected new sound source using the first beamformer 152. If it is determined that the change angle per unit time of the direction of the sound source detected by the sound source direction detecting part 151 is equal to or greater than the threshold while the second beamformer 153 is outputting the second signal, the directivity control part 155 causes the first beamformer 152 to output the first signal.

If the direction of the detected new sound source is the same as the direction of a sound source detected in the past, the directivity control part 155 may use the beamformer coefficient associated with the direction of the sound source detected in the past. Specifically, if it is determined that the direction of the sound source that has been newly detected by the sound source direction detecting part 151 (the third direction) is the same as the first direction, which was detected in the past, the directivity control part 155 causes the first beamformer 152 to output the first signal using the beamformer coefficient stored in the storage part 154 in association with the first direction. Since the directivity control part 155 uses the beamformer coefficient stored in the storage part 154, it is possible to reduce the time required for the beamformer to start the operation.

As described above, the directivity control part 155 alternately uses the first beamformer 152 and the second beamformer 153 every time a new sound source is detected. As a result, the signal processing apparatus 10 can collect sound generated from a plurality of sound sources when the sound source is switched, even though there is a certain amount of time when sound is generated from a plurality of sound sources at the same time.

Next, an operation of the directivity control part 155 to control the first attenuation part 12 and the second attenuation part 13 will be described. The directivity control part 155 calculates attenuator gains for the first attenuation part 12 and the second attenuation part 13 on the basis of an elapsed time after the timing when a new sound source was detected. The directivity control part 155 adjusts the levels of signals output from the first attenuation part 12 and the second attenuation part 13 by setting the calculated attenuator gains for the first attenuation part 12 and the second attenuation part 13.

If a new sound source has been detected, the directivity control part 155 increases an output level of an attenuation part downstream from the beamformer corresponding to the range including the new sound source. On the other hand, the directivity control part 155 decreases an output level of an attenuation part downstream from the beamformer corresponding to a range that does not include the new sound source. The following describes a case where the first range corresponding to the first signal output by the first beamformer ceases to include a sound source over time and the second range corresponding to the second signal output by the second beamformer progressively changes to include a new sound source over time. In this case, an attenuation part that is downstream from the first beamformer and that reduces the level of a signal is the first attenuation part 12, and an attenuation part that is downstream from the second beamformer and that increases the level of a signal is the second attenuation part 13.

If it is determined that the change angle is equal to or greater than the threshold while the first beamformer 153 is outputting the first signal, the directivity control part 155 decreases an output level of the first signal. When decreasing the output level of the first signal, the directivity control part 155 decreases the output level of the first signal by an attenuation factor based on an elapsed time after it was determined that the change angle was equal to or greater than the threshold. The directivity control part 155 operates the first attenuation part 12 at an attenuation factor corresponding to an attenuator gain determined on the basis of an attenuation coefficient and an elapsed time.

The attenuator gain is determined by multiplying an attenuation coefficient C by an elapsed time T, for example. The attenuation coefficient C is a negative fixed value, for example. In this way, the attenuator gain calculated on the basis of the elapsed time is set for the first attenuation part 12. This allows the directivity control part 155 to attenuate the first signal gradually, and thus it is possible to prevent the sudden disappearance of sound generated from a sound source.

Further, the directivity control part 155 increases an output level of the second signal output from the second beamformer 153. For example, the directivity control part 155 increases the output level of the second signal at a change speed larger than a change speed for decreasing the output level of the first signal. The change speed is determined by an amount of change in the output level per unit time. As described above, since the directivity control part 155 increases the output level of the second signal at a change speed larger than the change speed for decreasing the output level of the first signal, the output level of the second signal is increased in a short time. Therefore, the signal processing apparatus 10 can output a voice of a person who has started to speak, at a sufficient volume from the beginning. The directivity control part 155 may increase the output level of the second signal while decreasing the output level of the first signal. Since the directivity control part 155 operates in this way, it is possible to prevent the occurrence of a silent period between the first signal and the second signal when the signal processing apparatus 10 is switching the output between the first signal and the second signal.

<Flow of Detection Processing of New Sound Source>

Figure 5:
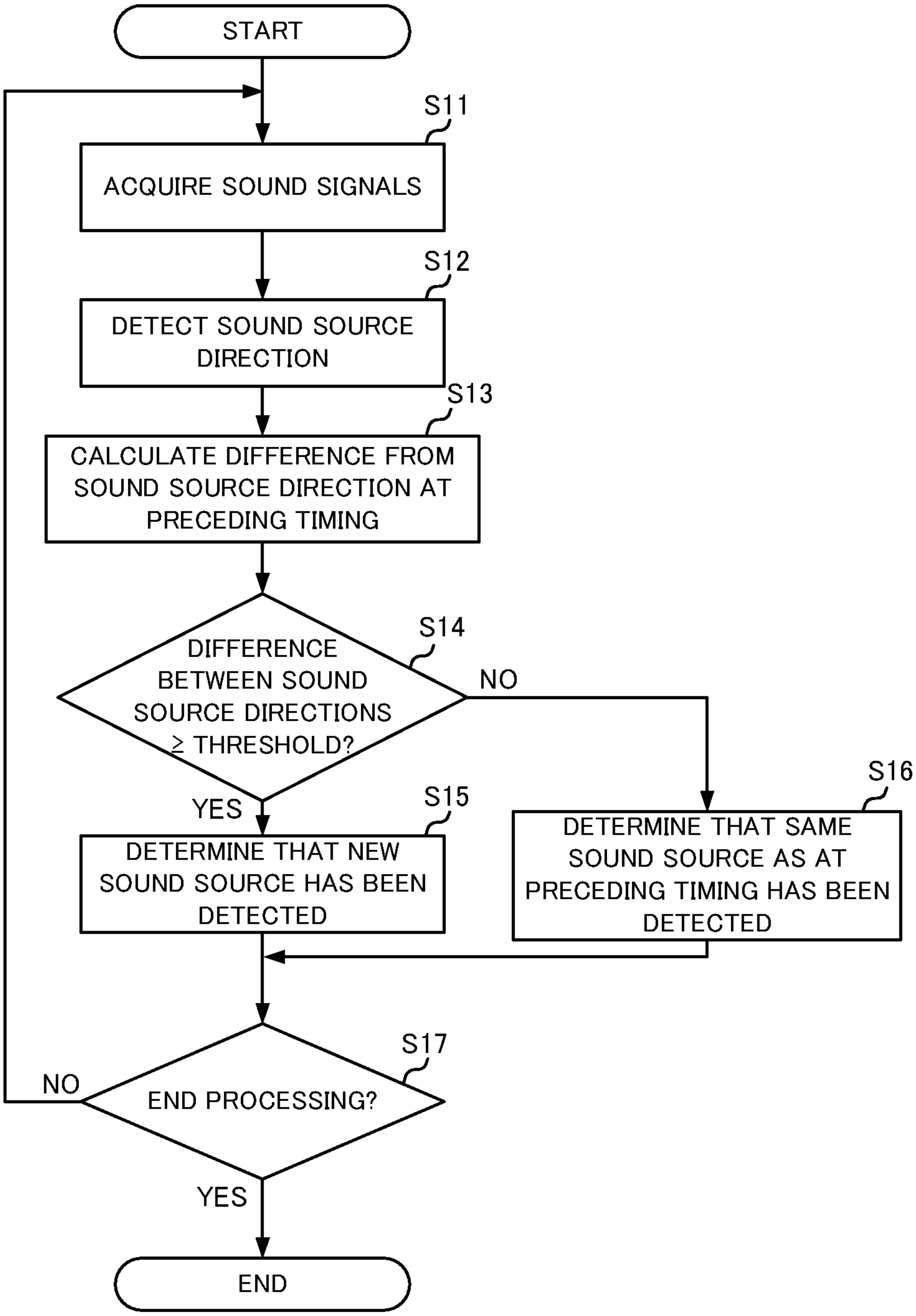
FIG. 5 is a flowchart showing a flow of processing by a beamforming processing part 15 for determining whether or not a new sound source has been detected.

FIG. 5 is a flowchart showing a flow of processing by the beamforming processing part 15 for determining whether or not a new sound source has been detected. The sound source direction detecting part 151 acquires a plurality of sound signals amplified by the input part 11 (S11). The sound source direction detecting part 151 detects a sound source direction on the basis of the plurality of acquired sound signals (S12).

The directivity control part 155 calculates a difference between the sound source direction at the current timing and the sound source direction at the immediately preceding timing, both detected by the sound source direction detecting part 151 (S13). If the calculated difference between the sound source directions is equal to or greater than the threshold ("YES" in S14), the directivity control part 155 determines that a new sound source has been detected (S15). If the calculated difference between the sound source directions is less than the threshold ("NO" in S14), the directivity control part 155 determines that the same sound source as at the immediately preceding timing has been detected (S16).

If an operation for ending the detection processing of a new sound source has not been performed ("NO" in S17), the beamforming processing part 15 repeats the processing from S11 to S17. If the operation for ending the detection processing of a new sound source was performed ("YES" in S17), the beamforming processing part 15 ends the detection processing of a new sound source.

<Flow of Control Processing of Beamformer>

Figure 6:
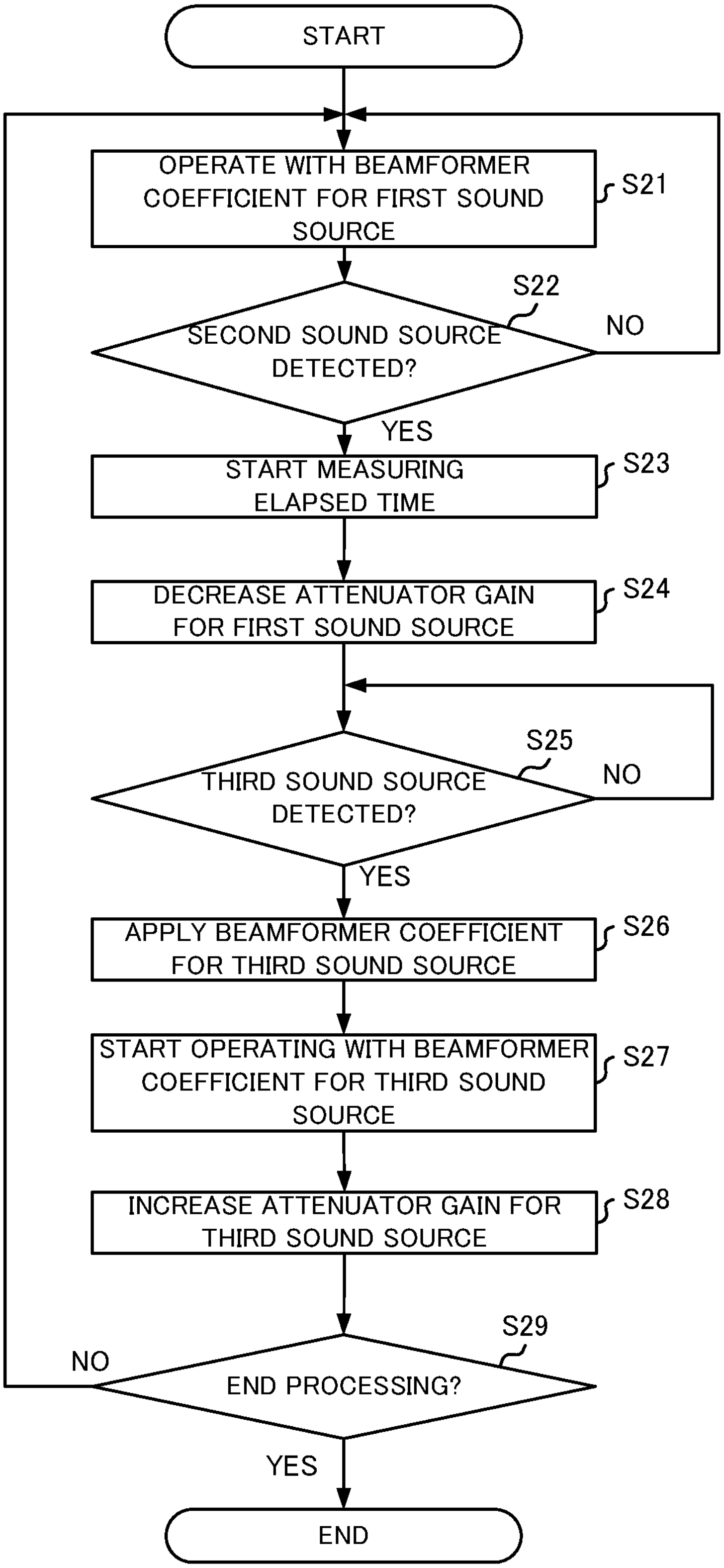
FIG. 6 is a flowchart showing a flow of processing by the beamforming processing part 15 for controlling a beamformer on the basis of the detection of the new sound source.

FIG. 6 is a flowchart showing a flow of processing by the beamforming processing part 15 for controlling a beamformer on the basis of the detection of a new sound source. FIG. 6 shows a flow of processing when the directivity control part 155 controls one beamformer among a plurality of beamformers included in the signal processing apparatus 10. The flowchart shown in FIG. 6 starts when the first beamformer 152 is outputting the first signal in a state of having the directivity towards the direction of the first sound source.

The first beamformer 152 operates with a beamformer coefficient for the first sound source (S21). If a second sound source has not been detected ("NO" in S22), the directivity control part 155 repeats processing of detecting a second sound source. If a second sound source was detected ("YES" in S22), the directivity control part 155 starts measuring an elapsed time (S23). The directivity control part 155 decreases an attenuator gain for the first sound source by calculating the attenuator gain for the first sound source on the basis of the measured elapsed time (S24).

If the directivity control part 155 detects a sound source other than the second sound source (e.g., a third sound source) while the first beamformer 152 is not operating ("YES" in S25), the directivity control part 155 applies the beamformer coefficient calculated for the third sound source to the first beamformer 152 (S26). The directivity control part 155 may obtain the beamformer coefficient for the third sound source by referencing the storage part 154. The first beamformer 152 starts the operation on the basis of the beamformer coefficient for the third sound source applied by the directivity control part 155 (S27). The directivity control part 155 increases an attenuator gain for the third sound source (S28).

If the directivity control part 155 has not detected a third sound source while the first beamformer 152 is not operating ("NO" in S25), the directivity control part 155 repeats processing of detecting a third sound source. If an operation for ending processing of controlling the beamformer has not been performed ("NO" in S29), the beamforming processing part 15 repeats the processing from S21 to S28. If the operation for ending the processing of controlling the beamformer was performed ("YES" in S29), the beamforming processing part 15 ends the processing of controlling the beamformer.

<Effect of the Sound Collection System S>

As described above, the sound collection system S includes: the first beamformer 152 that outputs a first signal obtained by emphasizing a sound signal based on sound coming from a direction within a first range among sound signals based on sound arriving at a plurality of microphones 2; and the second beamformer 153 that outputs a second signal obtained by emphasizing a sound signal based on sound coming from a direction within a second range among a plurality of sound signals. Then, the directivity control part 155 switches the beamformer being caused to perform the beamforming processing, on the basis of a direction of a sound source.

The sound collection system S can collect a plurality of voices without interruption in the voices generated by a plurality of speakers, even though a speaker generating a voice is switched among the plurality of speakers.

It should be noted that although FIG. 1 describes a case where there are three speakers, the sound collection system S can also be used in a situation where there are four or more speakers. Although in the above description the sound collection system S is provided with two beamformers, by providing three or more beamformers to the sound collection system S, the sound collection system S may collect sound in a state of having the directivity towards each of three or more sound source directions.

The present invention is explained on the basis of the exemplary embodiments. The technical scope of the present invention is not limited to the scope explained in the above embodiments and it is possible to make various changes and modifications within the scope of the invention. For example, all or part of the apparatus can be configured with any unit which is functionally or physically dispersed or integrated. Further, new exemplary embodiments generated by arbitrary combinations of them are included in the exemplary embodiments. Further, effects of the new exemplary embodiments brought by the combinations also have the effects of the original exemplary embodiments.

What is claimed is:

1. A sound collection system comprising:

a microphone array including a plurality of microphones;

a first beamformer that outputs a first signal obtained by emphasizing a sound signal based on sound coming from a direction within a first range, among a plurality of sound signals based on sound arriving at the plurality of microphones, more than sound signals based on sound coming from other directions;

a second beamformer that outputs a second signal obtained by emphasizing a sound signal based on sound coming from a direction within a second range, among the plurality of sound signals, more than sound signals based on sound coming from other directions;

a sound source direction detecting part that detects a direction of a sound source generating sound arriving at the plurality of microphones; and a directivity control part that causes the second beamformer to output the second signal if it is determined that a change angle per unit time of the direction of the sound source detected by the sound source direction detecting part is equal to or greater than a threshold while the first beamformer is outputting the first signal.

2. The sound collection system according to claim 1, wherein if it is determined that a change angle per unit time of the direction of the sound source is less than the threshold while the first beamformer is outputting the first signal, the directivity control part causes the first beamformer to continuously output the first signal in a state where the first range has been changed.

3. The sound collection system according to claim 1, wherein if it is determined that the change angle is equal to or greater than the threshold while the first beamformer is outputting the first signal, the directivity control part decreases an output level of the first signal.

4. The sound collection system according to claim 3, wherein the directivity control part decreases the output level of the first signal by an attenuation factor based on an elapsed time after it was determined that the change angle was equal to or greater than the threshold.

5. The sound collection system according to claim 3, wherein the directivity control part increases an output level of the second signal while decreasing the output level of the first signal.

6. The sound collection system according to claim 3, wherein the directivity control part increases an output level of the second signal at a change speed larger than a change speed for decreasing the output level of the first signal.

7. The sound collection system according to claim 1, wherein if it is determined that the direction of the sound source is not included in the first range, the directivity control part causes the second beamformer to output the second signal.

8. The sound collection system according to claim 1, wherein before causing the second beamformer to output the second signal, the directivity control part determines the second range such that the second range includes the direction of the sound source.

9. The sound collection system according to claim 1, wherein if it is determined that a change angle per unit time of the direction of the sound source detected by the sound source direction detecting part is equal to or greater than a threshold while the second beamformer is outputting the second signal, the directivity control part causes the first beamformer to output the first signal.

10. The sound collection system according to claim 1, further comprising a storage part that stores the direction of the sound source detected by the sound source direction detecting part and a beamformer coefficient in association with each other, wherein the directivity control part causes the first beamformer or the second beamformer to output the first signal or the second signal using the beamformer coefficient stored in the storage part in association with the direction of the sound source detected by the sound source direction detecting part.

11. The sound collection system according to claim 10, wherein the storage part stores a direction of a sound source detected by the sound source direction detecting part in the past, and a beamformer coefficient calculated by the directivity control part in the past on the basis of this direction, in association with each other, and if it is determined that a direction of a sound source newly detected by the sound source direction detecting part is the same as the direction of the sound source detected in the past and stored in the storage part, the directivity control part uses the beamformer coefficient stored in association with the direction of the sound source detected in the past.

12. A sound collection method comprising the steps of:

outputting a first signal obtained by emphasizing a sound signal based on sound coming from a direction within a first range, among a plurality of sound signals based on sound arriving at a plurality of microphones, more than sound signals based on sound coming from other directions;

detecting a direction of a sound source generating sound arriving at the plurality of microphones; and outputting a second signal obtained by emphasizing a sound signal based on sound coming from a direction within a second range, among the plurality of sound signals more than sound signals, based on sound coming from other directions, if it is determined that a change angle per unit time of the direction of the sound source is equal to or greater than a threshold while the first signal is being output.

13. A non-transitory storage medium storing a program for causing a computer to function as:

a first beamformer that outputs a first signal obtained by emphasizing a sound signal based on sound coming from a direction within a first range, among a plurality of sound signals based on sound arriving at a plurality of microphones, more than sound signals based on sound coming from other directions;

a second beamformer that outputs a second signal obtained by emphasizing a sound signal based on sound coming from a direction within a second range, among the plurality of sound signals, more than sound signals based on sound coming from other directions;

a sound source direction detecting part that detects a direction of a sound source generating sound arriving at the plurality of microphones; and a directivity control part that causes the second beamformer to output the second signal if it is determined that a change angle per unit time of the direction of the sound source detected by the sound source direction detecting part is equal to or greater than a threshold while the first beamformer is outputting the first signal.

* * * * *